United States

[11] 3,617,116

[72] Inventor Donald C. Jones
Southbridge, Mass.
[21] Appl. No. 794,869
[22] Filed Jan. 29, 1969
[45] Patented Nov. 2, 1971
[73] Assignee American Optical Corporation
Southbridge, Mass.

[54] METHOD FOR PRODUCING A UNITARY COMPOSITE OPHTHALMIC LENS
1 Claim, 9 Drawing Figs.

[52] U.S. Cl. .................................................... 351/177,
351/169, 351/176, 350/184, 350/189
[51] Int. Cl. .................................................... G02c 7/02
[50] Field of Search ............................................ 351/169,
159, 172, 176; 350/184, 190, 189

[56] References Cited
UNITED STATES PATENTS
3,507,565   4/1970   Alvarez et al. .................   351/17
1,561,860   11/1925  Kennebeck ......................   350/184
1,692,973   11/1928  Babcock .........................   351/169 UX
1,771,844   7/1930   Ellenberg et al. ..............   350/184
1,948,636   2/1934   Tillyer ..........................   351/176 X
2,001,952   5/1935   Birchall ........................   351/169
2,263,509   11/1941  Lewis ............................   351/176 UX
2,618,200   11/1952  Clave et al. ...................   351/172
3,305,294   2/1967   Alvarez .........................   351/169

FOREIGN PATENTS
250,268   7/1926   Great Britain ................   350/190

Primary Examiner—David H. Rubin
Attorneys—William C. Nealon, Noble S. Williams and Robert J. Bird ABSTRACT: A method of producing a unitary composite ophthalmic lens, in which the lens includes two thin lens elements having a pair of outer lens surfaces, each of controlled related compound curvature, and a pair of inner adjacent flat or spherically curved surfaces in mutually adjustable engagement for providing any sphere or cylinder prescription desired within a relatively wide predetermined prescription range, and then fixedly secured.

PATENTED NOV 2 1971 3,617,116
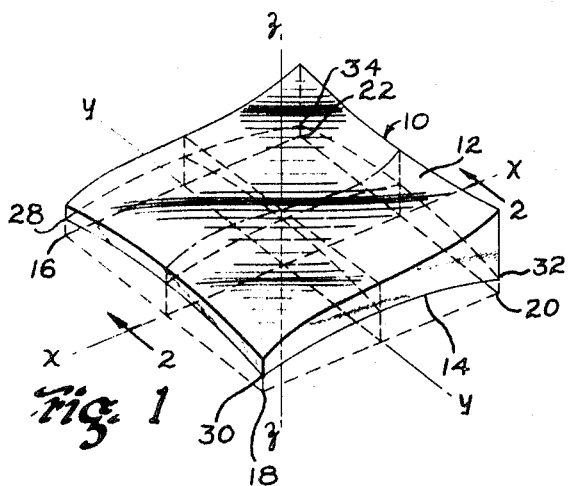
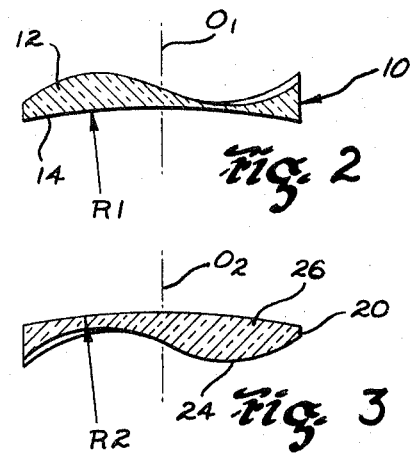
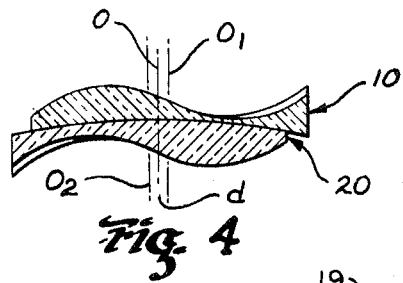
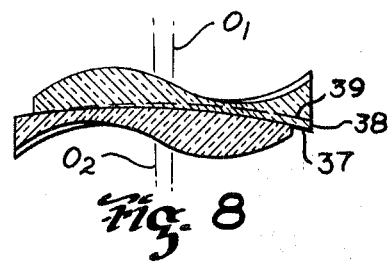
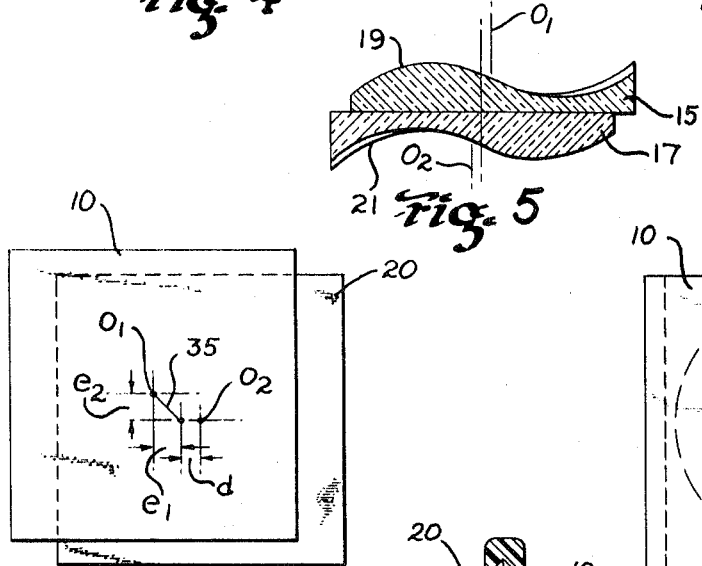
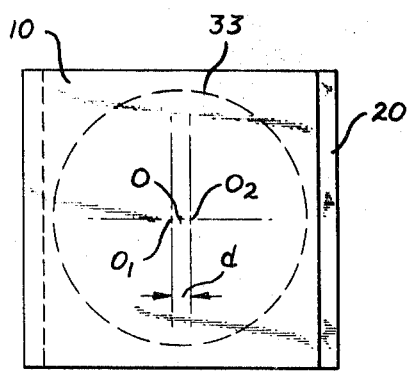
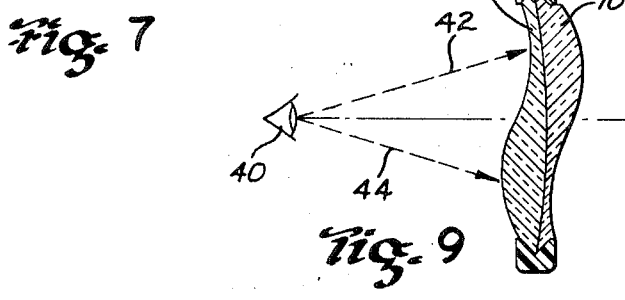
INVENTOR.
DONALD C. JONES
BY
Noble S. Williams
ATTORNEY

METHOD FOR PRODUCING A UNITARY COMPOSITE OPHTHALMIC LENS

This invention relates to a composite ophthalmic lens comprising two thin lens elements having a pair of flat or spherically curved engaging surfaces on the inner sides thereof and a pair of surfaces of compound curvatures on the outer sides thereof, said compound surfaces being so related and controlled relative to each other that said elements, when subsequently bodily adjusted different controlled amounts in a first predetermined lateral direction relative to each other will provide any positive or negative spherical prescription desired within a relatively wide dioptric range, when bodily adjusted (without rotation) different controlled amounts in a second lateral direction relative to each other, which second direction is disposed at 45° to said first direction, will provide any positive or negative cylindrical prescription desired within a second relatively wide range, and when bodily adjusted different controlled amounts in said first direction and additionally different controlled amounts in said second direction will provide different amounts of spherical and cylindrical powers combined within said predetermined prescription ranges and with the axis of the resulting eye lens extending in the 135° direction.

Single-vision prescriptive lenses are now generally supplied by selecting lenses from a large inventory of factory surfaced, factory-and-branch-surfaced lenses, or by grinding and polishing one or both surfaces of a lens blank in an optician's shop to an individual's corrective requirements. Both of these procedures, when carefully controlled and carried out, permit excellent results. They require, however, substantial inventories and special surfacing equipment as well as many skilled operators at different locations in order to have such systems work at their various distribution points.

At some locations, on the other hand, such as military field operations, or in backward countries and underdeveloped areas, it may not be possible or at least not practical to supply such inventories of lenses, blanks, equipment and skilled personnel.

It is, therefore, a principal object of this invention to provide an ophthalmic lens comprising a pair of prefabricated lens elements which have suitably mutually matching or mating inner surfaces and also surfaces of controlled related compound curvatures on their outer sides which are such that when one element is moved into a first predetermined position of lateral adjustment relative to the other, and even into a second predetermined position of lateral adjustment in a different direction if desired, and then secured together, a finished ophthalmic lens of any selected spherical or toric prescription required within a relatively wide predetermined range may be provided.

It is recognized, as evidenced by U.S. Pat. No. 3,305,294, issued Feb. 21, 1967, that two similar thin ophthalmic lens elements or components such as shown in FIG. 12 may be provided on their adjacent inner sides with a pair of refractive surfaces of compound curvatures of such controlled related values that they may be used together and suitably laterally linearly adjusted, one relative to the other, so as to provide an ophthalmic lens of any spherical dioptric power, positive or negative, desired within a sizable range. In effect, each position of adjustment of these lens elements affords an air lens of varying refractive characteristics therebetween which, of course, very materially affects the overall thickness of the assembly.

The surfaces of compound curvatures of the two lens elements of said earlier patent have been primarily considered and discussed in terms of varying thicknesses, $t$, through each and every different part of each lens element and this thickness has been defined by a lens equation related to a system of rectangular coordinates of mutually perpendicular axes $x$, $y$ and $z$; and with the optical axis of each lens element being considered as coincident with the $z$ axis of the system. Each lens element had a first surface which was flat or a surface of revolution and a second surface which was a surface of varying compound curvatures defined by the following lens equation:

$$t = A(xy^2 + (1/3)x^3) + Dx + E \quad (1)$$

and wherein $t$ is the thickness at any point $x, y$, $A$ is a constant which determines the rate at which the lens power varies with movement of one lens element relative to the other parallel to the $x$ axis, $D$ is a coefficient of the equation that is linear in $x$ (for reducing the thickness of the lens element by a wedge-shaped volume, equal in effect to rotating the curved variable power surface of the lens element a small angular amount about its $y$ axis while the opposite surface of the element is held fixed), and E is a constant representing the thickness of the lens element at its center along its transverse ($y$) center line.

As shown in FIG. 12 of said patent, these lens elements are disposed with their respective surfaces of compound curvatures in adjacent relation to each other. Such an arrangement, it should be appreciated, not only of necessity has appreciable thickness in every position of adjustment in the assembled condition thereof wherein lens power is provided, but also, of course, requires that the air lens therebetween be present in order to function properly. In other words, these two lens elements cannot merely be cemented together by Canada balsam or the like therebetween after being moved into the proper position of lateral adjustment and still be expected to function properly. Instead, suitable auxiliary means is required for securing these lens elements together for any selected position of lateral adjustment.

It has now been found that by following the teachings of the present invention, wherein a pair of lens elements having a pair of adjacent flat engaging inner surfaces or a pair of similarly but oppositely spherically curved engaging surfaces are used and a pair of surfaces of related compound curvatures are employed upon the outer sides of said elements, it is possible to provide an improved ophthalmic lens capable of caring for any spherical or toric prescriptive dioptric requirement within a relatively large predetermined ophthalmic range. For example, pairs of lenses may be provided for caring for prescriptive requirements from +8.00D to −8.00D sphere power and a range from +4.00D to −4.00D cylinder power, or it may be desirable to provide pairs of lenses capable of caring for a lesser range, such as from +4.00D to −4.00D sphere power and from +1.50D to −1.5D cylinder power.

While a pair of lens elements using adjacent flat surfaces has been referred to for providing an ophthalmic lens of the present invention, it will be appreciated that generally it will be preferred to use a pair of lens elements employing spherically curved surfaces in adjacent mating relation since a finer degree of corrections for other lens aberrations can be obtained; particularly when the spherical curvature for these adjacent engaging surfaces is taken so as to approximately equal a conventional base curve value of between −2.00D and −6.50D, well known in the ophthalmic art.

It will be appreciated, of course, that when such a pair of related "flat" lens elements or such a pair of related "curved" lens elements employing matching spherical curvatures are provided, an entire range of prescriptive correction may be cared for thereby, merely by cementing or otherwise securing same together in properly adjusted relation to each other and thus a great deal of economy and time will result. Of course, the lens elements will be made relatively thin and in platelike form but of such a size as to allow an ophthalmic lens of full size to be formed from each assembled, adjusted and secured pair of lens elements. In fact, the provision of a large number of such flat lens elements or of positive and negative lens elements, as the case may be, will enable a dispensing unit, such as a military supply depot or dispensing unit in the field, to have almost immediately available for any patient's requirement substantially the correct lens power needed, and without requiring any grinding and polishing of lens surfaces to specific requirements to be performed.

It is, accordingly, a principal object of the present invention to provide an ophthalmic lens comprising two relatively thin related lens elements having flat inner surfaces, or two thin lens elements having spherically curved inner surfaces of like curvature but opposite powers, and having upon the outer surfaces of said lens elements refractive lens surfaces of such controlled related compound curvatures that when same are secured together in properly adjusted predetermined relation to each other an ophthalmic lens of a desired prescriptive requirement may be provided, same providing any desired spherical prescription within a relatively wide range of spherical and cylindrical dioptric powers.

Other objects and advantages of the invention will become apparent from the detailed description which follows when taken in conjunction with the accompanying drawings wherein:

FIG. 1 is a perspective view of an improved lens element which may be used together with a second complementary lens element for carrying out the invention;

FIG. 2 is a vertical sectional view taken upon section line X-X of FIG. 1 and looking in the direction of the arrows;

FIG. 3 is a vertical sectional view of an improved lens element of complementary type for use with the lens element of FIG. 2;

FIG. 4 is a transverse sectional view showing the lens elements of FIGS. 2 and 3 disposed in contacting relation to each other as a pair and one adjusted laterally relative to the other to provide a desired degree of spherical power for the ophthalmic lens to be cut therefrom;

FIG. 5 is a slightly modified form of the invention showing a pair of lens elements in contacting and laterally adjusted relation to each other;

FIG. 6 is a plan view showing a pair of lens elements, like those of FIG. 4 or 5, equally oppositely laterally adjusted in a first direction relative to a common axis through the assembly to provide a predetermined amount of spherical dioptric power therefor;

FIG. 7 is a plan view, somewhat like that of FIG. 6 but showing a pair of lens elements not only oppositely adjusted laterally in a first direction to provide a predetermined amount of spherical dioptric power but also equally and oppositely adjusted, one relative to the other in a diagonal direction at 45° to said first direction to provide a predetermined amount of cylindrical dioptric power as well for a given prescription;

FIG. 8 is a side view of a modified form of improved composite lens; and

FIG. 9 is a vertical cross-sectional view of an improved mounted lens ready for use by a wearer.

Referring to the drawings in detail and in particular FIG. 1, it will be seen that there is indicated by the numeral 10 an improved lens element for use in carrying out the invention. Upon an upper surface 12 of this lens element, which would be formed of glass or plastic of known refractive index, is provided a surface of compound curvature and upon the lower side thereof is provided a surface of revolution 14. In order that this lens element may be better referred to in detail, there is shown in this Figure an $x$-$x$ axis, a $y$-$y$ axis, and a $z$-$z$ axis, each arranged in mutually perpendicular relation to the other two. The thicknesses through any selected part of the lens is referred to as $t$, and it will be appreciated is taken in a direction substantially parallel to the axis $z$-$z$. On the other hand, the lens element 10 in the directions of $x$-$x$ and $y$-$y$ is of materially greater dimensions than in the direction $z$ and preferably would be large enough to care for a finished ophthalmic lens of as much as 64 mm. in its longest direction.

It will be appreciated, of course, that the lens element 10 may be provided upon its lower surface with a flat face such as would be contained within the dotted lines extending between corner points 16, 18, 20 and 22, if desired. A pair of such flat lens elements, of course, could be placed in complementary contacting relation to each other at their flat sides, as shown at 15 and 17 in FIG. 5, and with their $x$-$x$ axis parallel and then adjusted laterally oppositely relative to each other in the $x$-$x$ direction of the plates for providing any one of various different degrees of spherical dioptric power desired; relative movement of the elements in one direction from their central no-power position providing positive power and relative movement in the opposite direction providing negative power for the finished assembly. The outer refracting lens surfaces of compound curvature are indicated at 19 and 21 respectively.

On the other hand, better results might very well at times be obtained if, for example, upon a complementary pair of lens elements, such as suggested at 10 and 20 in FIG. 4, a pair of complementary spherically curved lens surfaces are provided, one being of predetermined concave curvature and the other of like but convex curvature. Thus, a pair of such lenses having equal radii may be fully engaged at their inner sides and may then be adjusted laterally as desired. Such lens element with a spherical surface 14, it will be readily appreciated, is indicated at 10 in FIG. 1 and includes corner points 28, 30, 32, and 34.

A cross section taken through this lens element 10 is also indicated in FIG. 2. The surface of compound curvature is indicated at 12 and the surface of concave spherical curvature indicated at 14. An arrow R1 represents the radius of curvature of this spherical surface provided on the lower side of the lens element. In FIG. 3, on the other hand, is shown the other lens element 20 of the pair. This element may have substantially the same type of compound curvature provided upon its lower side 24 as provided upon element 10 and a convex spherically curved surface 26 upon its upper side. The arrow R2 indicates the radius of curvature of this convex surface. The radii R1 and R2 of these lens elements have their respective centers of curvature coincident with the optical axis $0_1$ and $0_2$ of these two lens elements.

It follows, therefore, that these two complementary lens elements of the same pair may be placed in contacting relation to each other along their surfaces 14 and 26 and with their $x$-$x$ axes parallel and then adjusted oppositely laterally parallel to their $x$-$x$ axes a predetermined amount $d$, as indicated in FIG. 4, for effecting a control with reference to the spherical power to be provided through the lens assembly. The preselected optical axis of the upper lens element 10 where the central point of the compound curvature is $x=0$, $y=0$ is indicated by the numeral $0_1$ and likewise the preselected optical axis of the lower lens element 20 is indicated by the numeral $0_2$. The optical axis $0$ of the assembly after such is adjusted is shown half way therebetween. The adjusted elements are cemented or otherwise secured together. Nevertheless, such a lateral displacement has no detrimental effect upon the combined spherical power to be provided through the assembly, since the adjacent convex and concave spherical surfaces thereof are not intended to have any lens power in the completed structure.

It can also be shown that by following the principles of the present invention, a sphero-cylindrical or toric ophthalmic lens of desired combined powers can be achieved by additionally displacing one of the lens elements with respect to the other in a different manner. In the assembled structure shown in FIG. 4, the upper lens element 10 has been displaced to the right of axis $0$ and the lower lens element 20 has been displaced to the left, and thus the resulting spherical power provided by the assembly will be positive. A plan view of the same pair of lens elements in FIG. 6, however, shows the upper lens element 10 displaced an equal amount, $d$, relative to the lower lens element but the displacement in this FIGURE of element 10 is to the left and element 20 to the right and, accordingly, the spherical power provided by the assembly will be negative rather than positive. The $x$-$x$ axes of these two elements at this time lie in the same vertical plane. (Dotted circle 33 indicates an ophthalmic lens which can be obtained from such a pair of secured lens elements.)

On the other hand, in FIG. 7 a similar lateral displacement to that in FIG. 6 is indicated at $d$, but, also, the upper lens element 10 has been moved an additional amount $e_1$ in the same direction relative to the lower element and a like amount $e_2$ upwardly in the $y$-$y$ direction. In effect, this would amount to a diagonal movement in a 45° direction relative to $x$-$x$ and $y$-$y$ axes of both plates, as indicated by dotted line 35. Such diagonal movement will provide the assembly, in addition to the spherical power already mentioned, a controlled amount of cylindrical power as well. Relative diagonal movement in one direction will give an increased cylinder power and in the opposite direction a decrease therein.

It is, therefore, possible to consider a pair of such lens elements which have been adjusted in the x–x direction, or in the diagonal direction or both and then fixedly secured together in order to achieve any one of a wide variety of conventional positive and negative spherical or toric prescriptive requirements as desired.

The spectacles of said earlier patent are arranged to permit movement in a lineal direction only to achieve variations of different amounts of spherical power, such as might be used for a patient when adjusting for different viewing distances. Any ophthalmic mounting which would be required to permit such adjustment would be heavy, and probably expensive, and probably difficult to use as well, and would be subject to dust and moisture collecting in the space required between the lens elements. Even if no such variable adjustment were provided for such a pair of lens elements of earlier design, nevertheless, a heavy ophthalmic mounting arrangement would be required to hold both elements in their properly adjusted positions, since a space of necessity is always present between each pair of such elements when any lens power is provided thereby.

These objectionable conditions and problems of the earlier structure are here avoided by an ophthalmic lens of the improved type wherein the two complementary parts are nested and secured together at all parts of their adjacent surfaces and with no airspace therebetween.

If it is first considered that a pair of lenses of the plano type on their adjacent inner sides are being discussed, it should be appreciated that each may have on its opposite or outer side a surface of compound curvature such as is defined by the equation for varying values of $t$ at the various different $x, y$ locations thereon:

$$t = A(xy^2 + (1/3x^3)) + Dx + E. \quad (2)$$

This equation was set forth earlier in the text and the constant $A$, $D$ and $E$ are there defined.

These two lens surfaces of the lens elements would be combined and cemented with their plano surfaces adjacent and after proper adjustment therebetween.

As already stated, it is possible to displace one of said elements with respect to the other and thereby obtain any positive or negative sphere, cylindrical or toric power desired within predetermined limits. Such powers, of course, may be measured on a conventional lensometer or similar instrument.

After the elements have been cemented together in their properly adjusted position to provide the required prescription, the lens assembly may be cut to fit the ophthalmic frame by known techniques and mounted in a conventional eyeglass frame. These new lens elements and assembly technique will permit supplying almost all single-vision requirements rapidly by use of merely a stock of like single flat-sided ophthalmic lens elements of less than 100 millimeters in diameter. Of course, the constants in the thickness equation may be adjusted to permit the supplying of relatively "thin" or "thick" lenses as desired and prescriptions of at least from +8.00D to −8.00D of spherical power with or without from −4.00D to +4.00D cylindrical power can be cared for.

"Flat" joined spectacle lenses achieved as described above by the use of a pair of identical lens blanks have more spherical aberration and astigmatism and less clearance in front of the eyes of the wearers when mounted in ophthalmic frames than would be the case if pairs of spherically curved or bent lens elements were employed. For this reason, improved lenses of the latter type are preferred.

When an ophthalmic lens is provided by the use of a pair of improved lens elements having a spherically curved interface therebetween the element with the concave spherical surface may have its surface of compound curvature or variable power defined by thickness as follows:

$$t = A(xy^2 + (1/3x^3)) + Dx + E, \quad (3)$$

with all symbols thereof having the same meaning as before. The other element with a convex spherical surface thereon would have its surface of compound curvature or variable power defined by thickness as follows:

$$t = -A(xy^2 + (1/3x^3)) - Dx + E, \quad (4)$$

and with all symbols thereof likewise having the same meaning as before. The radii of curvature of the concave and convex surfaces of these two lens elements may be within the general range used for "bending" conventional corrected ophthalmic lenses; such as a value within the range of from 2.0 to 6.5 diopters. Such ophthalmic lenses having the spherically curved interfaces are not only cosmetically better appearing but also the optical performance thereof is materially enhanced.

In an eye lens of the character herein being described, there may be an advantage in having the variable power curve on the convex lens element not exactly equal to the variable power curve on the concave element.

In using eyeglasses, each eye uses various portions of the lens in front of the eye as the eye turns about its center of rotation. The power of each small portion of the lens should be substantially the same, as seen along the line of sight of the eye. The exact line of sight to be considered in the calculations will depend upon the particular average distance of objects to be viewed by the lens. In the lens calculation of said earlier patent, the thicknesses considered were in directions parallel to the z–z axis of the coordinates. It is better to maintain the thickness relationship along the lines of sight used by the eye as it rotates about its center of rotation.

This may be approximated by "stretching" or enlarging somewhat the coordinate system which defines the variable power surface of the convex lens element relative to that for the concave element.

This may be done by making $$t_{cx} = A_1(xy^2 + (1/3x^3)) + D_1x + E \quad (5) \text{ and}$$
$$t_{cv} = -A_2(xy^2 + (1/3x^3)) - D_2x + E, \quad (6)$$

wherein $t_{cx}$ is the thickness of the convex element and $t_{cr}$ is the thickness of the concave element, and wherein $$A_2 > A_1 \quad (7) \text{ and}$$
$$D_2 > D_1. \quad (8)$$

The desirable range of these constants for an ophthalmic lens is from $A_2/A_1$ 1+3/2·$E/r$ (9)
to $A_2/A_1$ 1+6$E/r$ (10)
and from
$D_2/D_1$ 1+$E/2r$ (11)
to $D_2/D_1$ 1+2$E/r$ (12)

and wherein $r$ is the distance to be employed between the lens and the center of rotation of the eye. $2E$ is approximately the average thickness of the combined lens at its center.

In special cases, it may be desirable to have a slight amount of prism built into an improved composite lens embodying the invention; and this may be easily effected, as shown in FIG. 8, by arranging one of the spherically curved surfaces with its center of curvature slightly removed to one side of the normal central axis of the lens. Such built-in prism is suggested at 38 in FIG. 8 wherein a wedge shape is indicated between a solid curved line 37 and a dotted curved line 39.

An additional advantage to be obtained from an ophthalmic lens embodying the present invention and having a spherically curved interface and spherical power and thus a generally meniscus shape, is that it may be employed in an ophthalmic mounting and so positioned therein that the steepest part of the meniscus shape is nearer the upper part of the ophthalmic mounting. When such is the case, the shape factor of the "bent" composite lens may be taken advantage of as will be readily apparent from inspection of FIG. 9. If it is imagined that the wearer's eye is located at point 40, for instance, and he or she is looking in the direction of arrow 42, this line of sight will traverse a more steeply bent portion of the composite lens than will a line of sight when looking in the direction of the arrow 44. It follows, therefore, that if the wearer of a lens of the FIG. 9 type is looking through the upper part of this lens at distant objects and same is the more steeply bent part of the lens, he will be benefited thereby. It is well known from the study of corrected curve ophthalmic lens that a lens design optimized for far-field viewing is more steeply bent (that is, more meniscus in shape) than is a lens designed and optimized purely for nearviewing purposes.

It follows, therefore, that this improved bent composite lens of the present invention can be better corrected for both near and farviewing than is possible with a simple spherically curved lens of conventional design.

In the Figures of the drawing, the sizes, shapes, curvatures and amounts of adjustment of parts have been exaggerated and are given for illustrative purposes only. Accordingly, they are not to be considered in any way restrictive of the invention, except insofar as defined by the appended claims.

I claim:

1. A method for forming a unitary composite ophthalmic lens which provides any conventional ophthalmic prescription desired within a predetermined range of spherical powers ranging from +8.00D to −8.00D in combination with a predetermined amount of cylindrical power ranging from near zero to ±4.00D, the method comprising the steps of forming two thin platelike lens elements of a transparent optical material having a predetermined refractive index, each platelike lens element having an optical axis extending centrally therethrough and disposed in a perpendicular relation to the general plane thereof, the platelike lens elements having respective inner adjacent surfaces of such predetermined shapes as to be capable of fitting closely together in any offset operative position thereof, each of the platelike lens elements having on its outer surface a finished refractive lens surface of predetermined compound curvature, the optical thickness, $t$, of each lens element being substantially defined by the formula
$$t = A(xy^2 + (1/3)x^3) + Dx + E$$
wherein $x$ and $y$ represent coordinates in mutually perpendicular relation to each other and approximately at right angles to the optical axis of the platelike lens element, relative lateral displacement between the platelike lens elements is in the $x$ direction for contributing spherical dioptric power, $A$ is a constant for determining the rate of change of lens power with lens displacement in the $x$ direction, $D$ is a constant for determining wedge-shaped prism volume by a term which is linear in $x$, and $E$ is a constant representing the thickness of each platelike lens element at the optical axis thereof, mating the inner adjacent surfaces of the two thin platelike lens elements in a tandem relation with the respective $x$ and $y$ coordinates being similarly oriented, laterally adjusting the relative position of the two thin platelike lens elements while maintaining the $x$ and $y$ coordinate orientation to provide the desired prescriptive dioptric power, cylindrical dioptric power being provided by adjustment of the relative positions of the two thin platelike lens elements in a direction approximately orthogonal to the optical axis and at approximately a 45° angle to the $x$ direction, fixedly securing the two thin platelike lens elements together, and finishing the secured assembly to form a unitary composite ophthalmic lens of the desired configuration and ophthalmic prescription.

* * * * *